UNITED STATES PATENT OFFICE.

MICHEL E. SAVIGNY, OF NEW YORK, N. Y.

DYEING-EXTRACT.

SPECIFICATION forming part of Letters Patent No. 306,435, dated October 14, 1884.

Application filed July 11, 1884. (No specimens.) Patented in England January 9, 1884, No. 1,032.

*To all whom it may concern:*

Be it known that I, MICHEL EDMOND SAVIGNY, a citizen of the Republic of France, and a resident of the city of New York, State of New York, United States of America, have invented certain new and useful Coloring-Matters, produced by a process invented by me, hereinafter set forth, from the so-called "yellow-colored tannic woods and plants," which coloring-matters possess the characteristics of the class of coloring-matter known as "catechus," or "Indian catechus," although differing therefrom.

The following is a full, clear, and exact description of my said process and the coloring-matters thereby produced.

My invention relates to a new and improved coloring-matter obtained by the treatment of such woods and plants as contain coloring-matter in sufficient quantity to be practically useful in the arts for dyeing woven fabrics, furs, skins, wood, or other articles to which it is desired to give an artificial color. These woods and plants contain, in addition to the coloring-matters, the substance known as "tannin," and they may be divided into two classes—*i. e.*, tannic woods or plants colored red and tannic woods or plants colored yellow.

My process, as set forth in this specification, relates to coloring-matters obtained by the treatment of the tannic plants and woods colored yellow.

My process for the treatment of the red-colored tannic woods and plants forms the subject of another application filed by me for Letters Patent therefor on January 11, 1884, being application numbered 117,145.

When a wood or plant contains tannin, or, in other words, tannic or gallic substances and little or no coloring-matter, either red or yellow, it is usually easy to obtain therefrom all the extractive substances by simply treating it with boiling water; but it is different when the wood or plant contains at the same time a large proportion of tannin and also a large proportion of coloring-matter. In such case water alone, even at a boiling-temperature, will dissolve only a portion of the tannin, much of it remaining in the wood, and with it most and sometimes all the coloring-matter, red or yellow, as the case may be.

In order to obtain the coloring-matter from these woods and plants—*i. e.*, those containing tannin and coloring-matter, red as well as yellow, in large quantities—various processes have heretofore been employed in which strong applications of alkali or alkaline salts have been employed to act as solvents on the coloring-matter and tannin. Now, the use of alkaline salts seriously deteriorates the dyeing qualities of the extract obtained.

My invention, which, as stated, has special reference to the production of yellow coloring-matters, I secure by the treatment of the yellow tannic woods and plants by a process by which I am enabled to secure all the coloring substances contained in such woods or plants, together with the tannin, without the deterioration incident to the use of alkalies or alkaline salts as heretofore used; and the process by which I obtain my coloring-matters is as follows: I first bruise, crush, powder, or finely divide the yellow-colored tannic wood or plant, and then place the same in any suitable vat, caldron, or other vessel capable of being heated in any desired manner. I then add to the wood or plant sufficient water to cover the wood or plant. I then raise the temperature to the boiling-point, and then add a quantity of animal or vegetable oil or equivalent fatty body, preferably employing such as are easily saponified by a small percentage of alkali. The proportion of this oil or fatty body to the wood is about a quart of oil or two pounds of fatty matter to a hundred pounds of the wood or plant. I then cause the mass to boil for about half an hour, and then, for the purpose of saponifying the oil or fatty body, I pour in a solution of alkali of known strength, using sufficient to saponify the oil or fatty body, but no more. When the saponification is complete, the liquor becomes clear.

Instead of using the oil and the fatty body and the alkaline solution, thus effecting saponification, I can use as a substitute therefor and produce the same result a solution of ordinary soap—either potash or soda—the percentage of alkali being so small in it, and it also being saponified, that it does not act detrimentally on the extract. I then draw off the clear liquor, which will be found to be heavily charged with the yellow coloring-matter and the tannin contained in the wood or plant. This liquor I evaporate in any suitable manner, and the result is my extract, which will compare very favorably with the favorite brands of catechus of the same class, the colors being so-called "fast colors." These extracts may be treated with the ordinary chemical agents and reactives, as now well known and practiced in the art in connection with catechus, and the same colors and shades of color will be obtained, and they may be used singly or combined with such other colors or shades of color or coloring materials as the dyer may desire. These extracts have been found by me particularly applicable for finishing, charging, and dyeing silks, and when charging silks I have found that I can beneficially combine my said extracts with tannic extracts.

I do not limit myself to the specific proportions stated, because they may be somewhat departed from, according to the nature of the wood or plant being treated, and yet my resulting extract be secured.

My extracts, produced by the above process, possess the following distinctive features, by which they can be readily distinguished by any one familiar with this art from all other coloring materials or extracts made from yellow-colored tannic woods and plants, to wit: All my extracts are fawn-colored, but of different shades of fawn color, and, when used, produce, without admixture or union with any other coloring material, the series of yellow-browns. All other extracts of yellow-colored tannic wood and plants, whether Indian catechus or others, are yellow-colored, not fawn-colored, and the fawn colors or yellow-browns, when desired by the use of these former coloring materials, must be obtained by admixing or uniting the yellows with other colors. Moreover, the extracts obtained by me are brittle in texture or consistency, while all others are gummy.

Having thus described my new and useful coloring-matters, I claim—

As a new article of manufacture for dyeing, &c., the described soap extract from yellow-colored tannin woods or plants, being of a fawn color or yellowish-brown appearance and of a brittle texture, substantially as and for the purposes set forth.

Signed at New York city, in the county of New York, and State of New York, this 8th day of July, A. D. 1884.

MICHEL E. SAVIGNY.

Witnesses:
 JOHN J. CAULDWELL,
 SHERWOOD CONNELL.